United States Patent
Charrier et al.

(10) Patent No.: US 11,261,798 B2
(45) Date of Patent: Mar. 1, 2022

(54) IMPELLER FOR A PLANET CARRIER OF AN EPICYCLIC SPEED REDUCTION GEAR OF A TURBINE ENGINE

(71) Applicant: SAFRAN TRANSMISSION SYSTEMS, Colombes (FR)

(72) Inventors: Mathieu Jean Charrier, Moissy-Cramayel (FR); Antoine Jacques Marie Pennacino, Moissy-Cramayel (FR); Jean-Charles Michel Pierre Di Giovanni, Moissy-Cramayel (FR); Florian Rappaport, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/097,838

(22) Filed: Nov. 13, 2020

(65) Prior Publication Data
US 2021/0148288 A1 May 20, 2021

(30) Foreign Application Priority Data
Nov. 15, 2019 (FR) .................................... 1912784

(51) Int. Cl.
*F02C 7/36* (2006.01)
*F16H 57/04* (2010.01)
(Continued)

(52) U.S. Cl.
CPC ........... *F02C 7/36* (2013.01); *F16H 57/0479* (2013.01); *F02C 7/06* (2013.01);
(Continued)

(58) Field of Classification Search
CPC .............................. F16H 57/0479; F02C 7/06
See application file for complete search history.

(56) References Cited

U.S. PATENT DOCUMENTS

| 8,911,318 B2 | 12/2014 | Iizuka |
| 10,100,842 B2 | 10/2018 | Bromann et al. |

(Continued)

FOREIGN PATENT DOCUMENTS

| FR | 3 036 763 A1 | 12/2016 |
| FR | 3 041 054 A1 | 3/2017 |

(Continued)

OTHER PUBLICATIONS

Rapport De Recherche Preliminaire and Written Opinion dated Jun. 10, 2020, issued in corresponding French Application No. 1912784, filed Nov. 15, 2019, 9 pages.

*Primary Examiner* — Derek D Knight
(74) *Attorney, Agent, or Firm* — Christensen O'Connor Johnson Kindness PLLC (57) ABSTRACT

An impeller for a planet carrier of a epicyclic speed reduction gear of a turbine engine is fixed in rotation to the planet carrier and is rotatable about an axis of the reduction gear. The impeller has an annular shape about the axis and includes means for lubricating in particular planet gear bearings of the reduction gear. The lubricating means include an annular cavity located at the inner periphery of the impeller, wherein the impeller has an inner peripheral wall that closes the cavity in the radial direction. The impeller further includes an annular aperture that extends around the axis and opens in the axial direction into the cavity to supply lubricating oil thereto.

13 Claims, 6 Drawing Sheets

(51) Int. Cl.
*F02C 7/06* (2006.01)
*F16H 57/08* (2006.01)

(52) U.S. Cl.
CPC ............ *F05D 2220/323* (2013.01); *F05D 2260/40311* (2013.01); *F05D 2260/98* (2013.01); *F16H 2057/085* (2013.01)

(56) References Cited

U.S. PATENT DOCUMENTS

| | | | |
|---|---|---|---|
| 2013/0313053 A1* | 11/2013 | Andersson | F16H 57/0473 188/71.5 |
| 2016/0377167 A1* | 12/2016 | Sheridan | F16H 57/0471 60/226.1 |
| 2018/0306293 A1* | 10/2018 | Uhkoetter | F02C 7/36 |
| 2019/0032514 A1 | 1/2019 | Gedin et al. | |
| 2019/0301466 A1* | 10/2019 | Violet | F16H 57/0486 |
| 2021/0148453 A1* | 5/2021 | Pennacino | F16H 57/0427 |

FOREIGN PATENT DOCUMENTS

| | | |
|---|---|---|
| FR | 3 047 279 A1 | 8/2017 |
| FR | 3 065 773 A1 | 11/2018 |
| WO | 2015/008000 A2 | 1/2015 |
| WO | 2018/185186 A1 | 10/2018 |
| WO | 2018/189457 A1 | 10/2018 |

\* cited by examiner

IMPELLER FOR A PLANET CARRIER OF AN EPICYCLIC SPEED REDUCTION GEAR OF A TURBINE ENGINE

CROSS REFERENCE TO RELATED APPLICATION

This application claims priority under 35 U.S.C. § 119 to French Patent Application No. 1912784, filed Nov. 15, 2019, which is incorporated by reference herein in its entirety.

BACKGROUND

The disclosed subject matter relates in particular to an impeller for a planet carrier of an epicyclic speed reduction gear of a turbine engine.

An epicyclic speed reduction gear of an aircraft turbine engine typically comprises a sun gear coupled to a first shaft and a ring gear extending around the sun gear. Planet gears are arranged between the sun gear and the ring gear and are meshed with them and carried by a planet carrier coupled to a second shaft.

Figure 1:
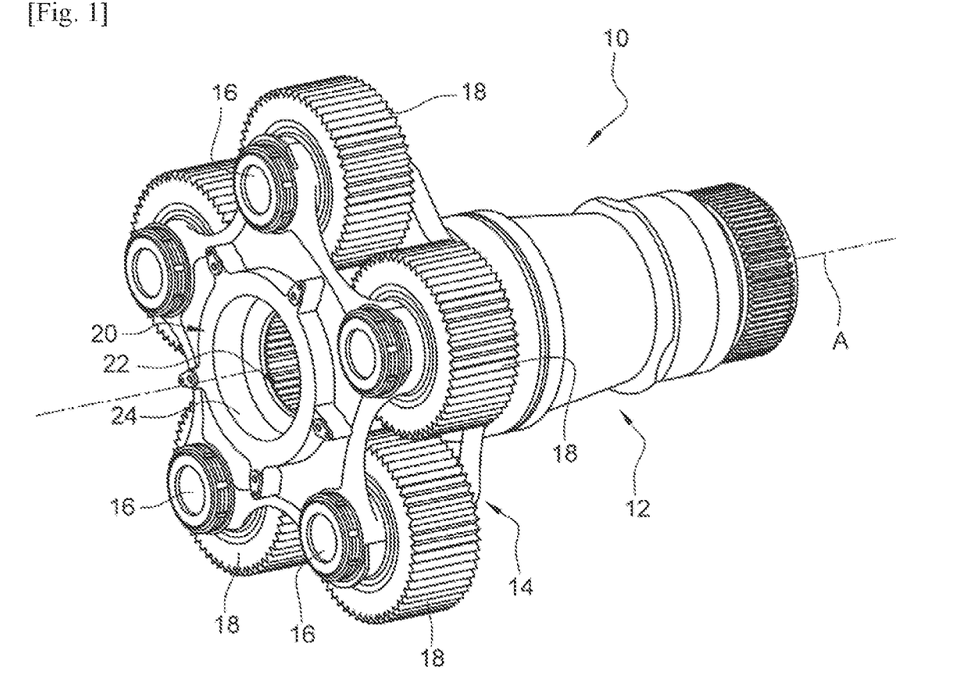
FIG. 1 is a schematic perspective view of a known planet carrier.

FIG. 1 shows a planet carrier 10 as described in French Patent Application FR-A1-3 036 763. This planet carrier 10 comprises a cylindrical body 12 intended to be coupled to the second shaft and connected at one longitudinal end to an annular wall 14 for supporting axles 16 parallel of rotation of the planet gears 18. The axles 16 are evenly distributed around the axis A of rotation of the planet carrier and are secured to one of their longitudinal ends to the aforementioned annular wall 14. An impeller 20 is mounted and fixed to the opposite longitudinal ends of the axles 16.

The impeller 20 is secured to the planet carrier 10 by virtue of its connection to the axles 16 for supporting the planet gears 18. The impeller 20 is therefore intended to be rotated during operation about the axis A by being secured to the rotor of the reduction gear.

The impeller 20 is generally annular in shape around the axis A and comprise hydraulic connections on its outer periphery to the axles 16 of rotation of the planet gears 18. The impeller 20 comprises means for lubricating, on the one hand, bearings mounted between the axles 16 and the planet gears 18, and, on the other hand, gear teeth of the planet gears 18 and the sun gear 22. These lubricating means comprise an annular groove 24 located on the inner periphery of the impeller 20 and opening radially inwards, i.e. towards the axis A.

Lubricant nozzles, carried by a stator of the reduction gear or turbine engine, are arranged radially inside the impeller (they are not shown in FIG. 1), and project lubricant directly into the groove 24 of the impeller, to supply the lubricating means.

The lubricant is supplied to the nozzles by a pump in a lubrication unit of the turbine engine, which delivers a predetermined flow rate of lubricant to the nozzles. With the current technology described above, the lubricant sprayed into the groove is conveyed to the lubricating means by centrifugal effect only.

The impeller therefore distributes pressurized oil into the reduction gear using the centrifugal forces generated during operation.

However, the oil pressure in the impeller depends on the height of the oil column and the speed of the impeller. One solution to increase the oil pressure is therefore to increase the height of the oil column by reducing the internal diameter of the impeller. However, the inside of the impeller is blocked by the lubricant nozzles in the groove of the impeller. Furthermore, these lubricant nozzles are cumbersome and risk coming into contact with the first shaft meshed with the sun gear of the reduction gear.

The disclosed subject matter is a further development of this technology, which provides a simple, effective and economical solution to the problem of lubricating an epicyclic reduction gear.

SUMMARY

According to an embodiment of the disclosed subject matter, an assembly for an aircraft turbine engine comprises:
an epicyclic speed reduction gear, and
at least one oil nozzle configured to project an oil jet parallel to a longitudinal axis of the turbine engine,
said reduction gear comprising a planet carrier equipped with an impeller which is intended to be fixed in rotation to said planet carrier and to be rotated about an axis A of said reduction gear, said impeller having an annular shape about said axis and comprising means for lubricating in particular planet gear bearings of said reduction gear, said lubricating means comprising an annular cavity located at the inner periphery of said impeller, the impeller comprising an inner peripheral wall for closing said cavity in the radial direction, the impeller comprising an annular aperture which extends around said axis and which opens in the axial direction into said cavity in order to be supplied with lubricating oil by said oil jet which is intended to pass through this aperture, characterized in that said cavity is axially bounded by two annular side walls, a first of these walls being connected at its radially inner periphery to said closing wall, and the second of these walls having its radially inner periphery radially spaced from said closing wall by a predetermined radial distance R4 to define said aperture, and in that said cavity comprises an inner frustoconical surface which is located axially opposite said aperture to be impacted by said oil jet and which has a radial dimension R3, with R4 less than R3.

The disclosed subject matter thus provides a turbine engine assembly, the reduction gear of which is equipped with an axial injection centrifugal impeller, i.e. the oil is brought into the cavity of the impeller by projecting this oil in the axial direction through the aperture of the impeller. This oil is fed into the cavity of the impeller and is then centrifuged to supply the lubricating means. It is no longer necessary to provide a nozzle or similar inside the impeller, which prevents the inside of the impeller from becoming clogged and limits the risk of interaction with the shaft, which is coupled to the sun gear of the reduction gear.

The inner frustoconical surface can be complex and has the function of guiding the oil by redirecting it radially outwards. The combination of this surface with the opening of predetermined radial dimension allows the oil to be guided in the best possible way, limiting projections and losses at the impeller, thus optimizing the supply of oil to the reduction gear and limiting its oil consumption.

The assembly according to various embodiments may comprise one or more of the following characteristics, taken in isolation from each other, or in combination with each other:
said second wall is mounted and fixed to the rest of the impeller;
R4 represents between 5 and 20% of R3;
said surface has an axial dimension representing between 30 and 60% of the axial dimension of said closing wall;

the radial dimension R3 of said surface represents between 20 and 50% of the radial dimension of at least one of said two side walls;

the radial dimension R4 of said aperture represents between 2 and 20% of the radial dimension of at least one of said two side walls or the radial dimension of the cavity;

said frustoconical surface is located at the junction between said first wall and said closing wall;

said lubricating means comprise oil pipes, mainly radial, and opening into said cavity; preferably the radially inner ends of these pipes open into the cavity;

at least some of the pipes comprise radial ends which are configured to be in fluid communication with internal cavities for lubricating bearings; preferably the radially outer ends of these pipes open into the cavity;

said pipes are evenly distributed about said axis;

at least some of said pipes are in fluid communication with the first longitudinal ends of lubricant nozzles, which are cantilevered at the outer periphery of the impeller;

the impeller comprises substantially radial arms comprising or carrying at their ends, preferably radially outer ends, means for supporting the axles of the planet gears, pipes being formed in these arms.

The present disclosure also relates to an aircraft turbine engine comprising said assembly.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

FIG. 1 has been described above and represents a known planet carrier. FIGS. 2 to 5 also illustrate the known turbine engine configurations as described in FR-A1-3 041 054.

FIG. 1 shows a turbine engine 100 which comprises, in a conventional manner, a fan propeller S, a low-pressure compressor 101a, a high-pressure compressor 101b, a high-pressure turbine 101d, a low-pressure turbine 101e and an exhaust nozzle 101h. The high-pressure compressor 101b and the high-pressure turbine 101d are connected by a high-pressure shaft 102 and form a high-pressure (HP) body with it. The low-pressure compressor 101a and the low-pressure turbine 101e are connected by a low-pressure shaft 103 and form with it a low-pressure (LP) body.

The fan propeller S is driven by a fan shaft 104 which is coupled to the LP shaft 103 by means of an epicyclic reduction gear 110, shown here schematically.

The reduction gear 110 is positioned in the upstream part of the turbine engine. In this patent application, the terms "upstream" and "downstream" refer to the gas flow through the turbine engine.

A fixed structure comprising schematically, here, an upstream part 105a and a downstream part 105b is arranged to form an enclosure E1 surrounding the reduction gear 110. This enclosure E1 is closed off upstream by seals at a bearing 106a allowing the fan shaft 104 to pass through, and downstream by seals at the passage 106b of the LP shaft 103.

Figure 2:
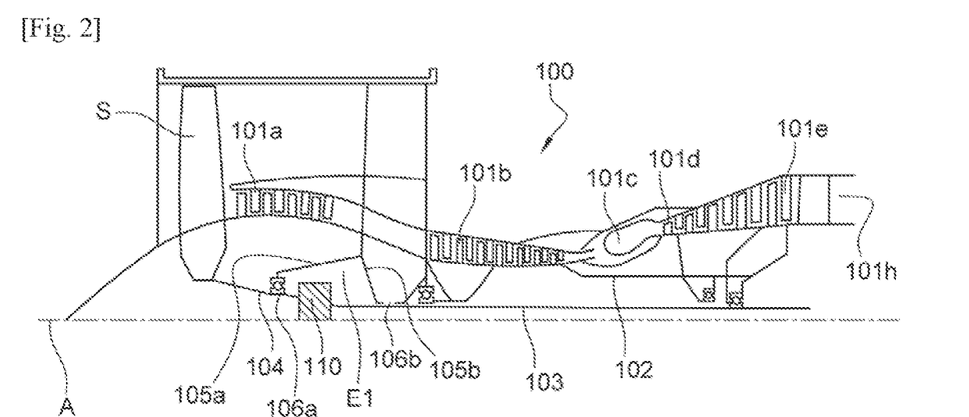
FIG. 2 shows a schematic axial section of a representative embodiment of a turbine engine.
Figure 3:
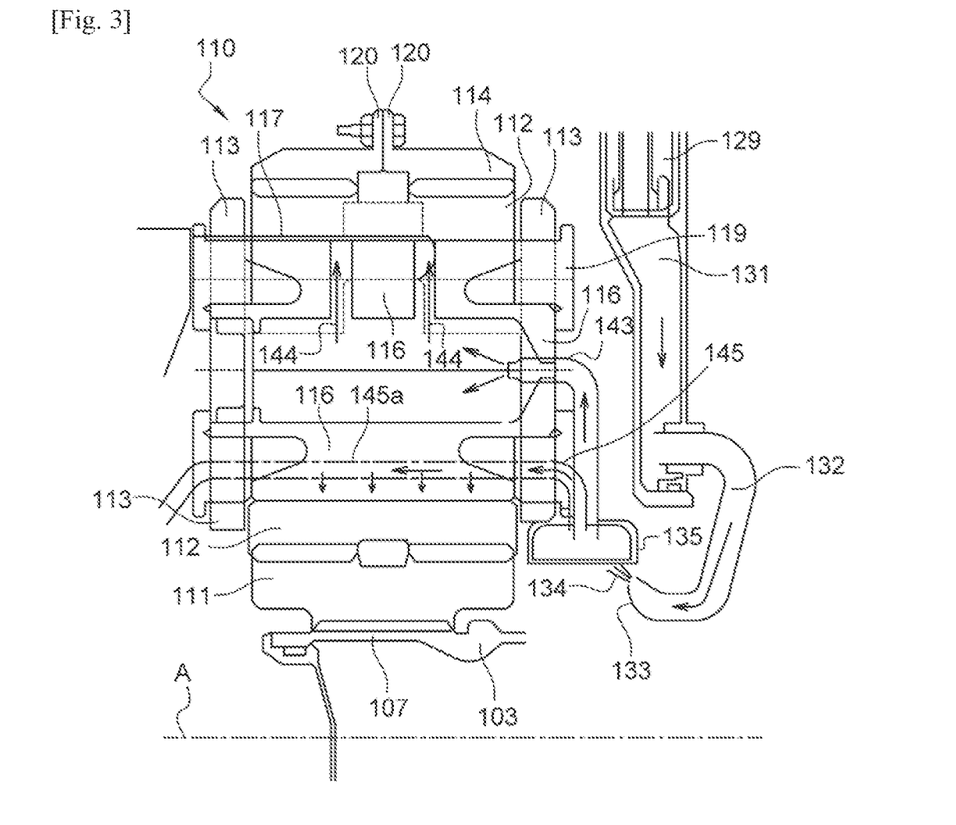
FIG. 3 shows a detailed cross-sectional view of an epicyclic reduction gear.

With reference to FIGS. 2 and 3, the reduction gear is enclosed in a ring gear 114 which is attached via a support casing 120 to said fixed structure 105a, 105b with flexible means arranged to enable it to follow any movements of the fan shaft 104, for example in certain cases of degraded operation. These attachment means are known to the person skilled in the art and are not detailed here. A brief description can be found, for example, in the document FR-A1-2 987 416.

The reduction gear 110 in the considered example engages on the one hand on the LP shaft 103 via splines 107 which drive a planetary gear pinion 111, and on the other hand on the fan shaft 104 which is attached to a planet carrier 113. Classically, the planetary pinion 111, whose axis of rotation A coincides with that of the turbine engine, drives a series of planet gear pinions 112, which are distributed evenly around the circumference of the reduction gear 110. The number of planet gears 112 is usually defined as between three and six. The planet gear pinions 112 also rotate around the axis A of the turbine engine, meshing with internal teeth of the ring gear 114, which is mounted fixed with respect to the turbine engine via the support casing 120. Each of the planet gears 112 rotates freely about a planet gear axle 116 connected to the planet carrier 113, by means of a bearing which may be a plain bearing, as shown in FIG. 3, or a rolling element bearing (ball or roller bearings). The rotation of the planet gears 112 about their planet gear axle 116, due to the cooperation of their pinions with the teeth of the ring gear 114, leads to the rotation of the planet carrier 113 about the axis A, and consequently to the rotation of the fan shaft 104 connected to it, at a speed of rotation which is lower than that of the LP shaft 103.

The drive of the fan shaft 104 through the planet carrier 113 is provided by a series of locating fingers 117, evenly distributed around the circumference of the reduction gear 110, which extend axially from the downstream end of the fan shaft 104 and engage in bores provided in the planet carrier 113. The planet carrier 113 extends symmetrically on either side of the planet gear axles 116 and forms an enclosure in which a lubricating function of the gears can be implemented. Closing bushing 119 at the ends of the planet gear axles 116 allow this enclosure to be closed at the bearings of the planet gears 112.

Figure 4:
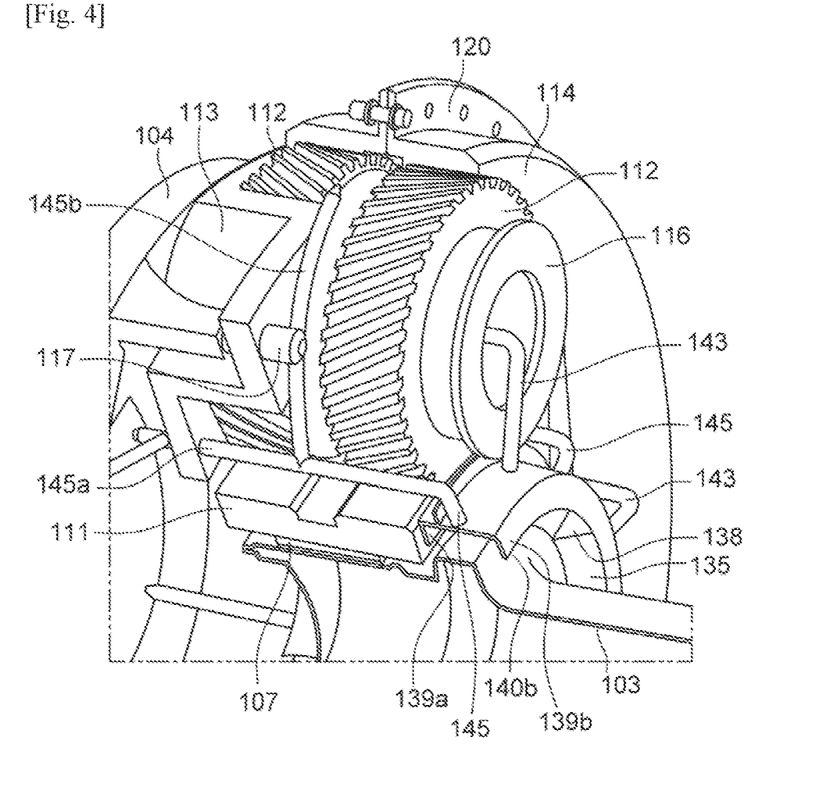
FIG. 4 is an exploded perspective view of the reduction gear of FIG. 3.

FIG. 3 shows, together with FIG. 4, the conveying of the oil to the reduction gear 110 and its path inside thereof. The arrows in FIG. 3 show the path of the oil from a buffer tank 131, which in this example is connected to the fixed structure of the turbine engine, to the pinions and bearings to be lubricated. The lubricating device comprises of three parts schematically which will be described below in succession, a first part linked to the fixed structure and delivering the oil to the rotating parts of the reduction gear 110, an impeller rotating with the planet carrier 113 receiving this oil, and oil distribution circuits supplied with oil by the impeller to convey it to the places to be lubricated. The first part comprises at least one injector 132 whose calibrated end is tightened to form a nozzle 133. The oil is fed to the injector through a conveying pipe 129 from the tank of the engine (not shown). A buffer tank 131 can be placed next to the reduction gear 110 on the pipe, preferably at the top, so that the oil can flow towards the center of the reduction gear by gravity. The nozzle 133 ejects the oil in the form of a jet 134, which is formed by the pressure produced jointly by the supply pump (not shown) and by the weight of the oil column above it. The nozzle 133 is positioned here radially inside the planet carrier 113 with respect to the axis A and the jet 134 is oriented with a radial component directed outside from the reduction gear 110.

Figure 5:
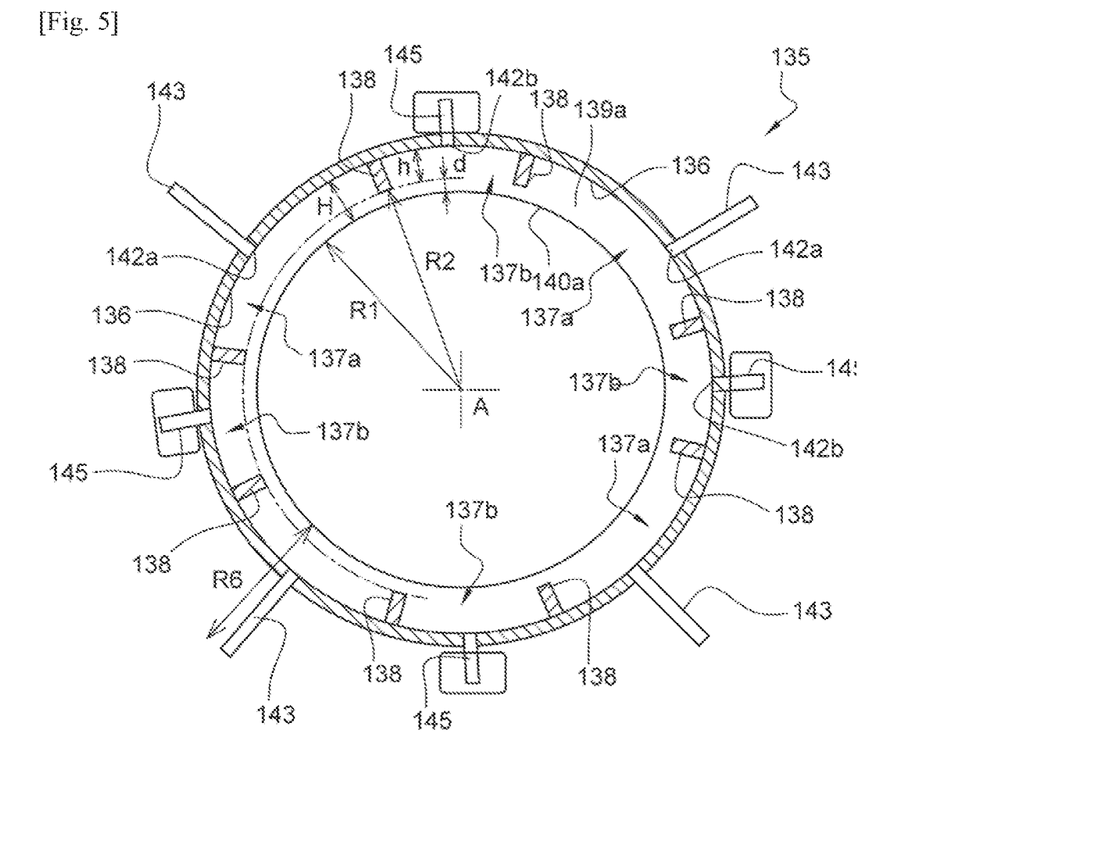
FIG. 5 shows a schematic cross-section of an impeller of the reduction gear of FIG. 3.

With reference to FIGS. 4 and 5, the reception impeller 130 of the oil connected to the planet carrier 113 essentially consists of a cylindrical cup 135, here with a U-shaped radial cross-section, the U-shaped opening of which is oriented in the direction of the axis of rotation A. The impeller 130 is arranged on the planet carrier 113 in such a way that the bottom 136 of the U-shape of the cup 135 collects the oil jet 134 ejected by the nozzle 133.

According to the invention, the cup 135 of the impeller 130 is here divided into a circumferential succession of bowls 137a, 137b separated by walls 138 oriented radially and extending axially between the two side walls 139a, 139b of the U formed by the cup 135. In the example shown, the circumferential dividing walls 138 delimit two alternating series of four bowls 137a, 137b, with the same circumferential extension in one series but different from one series to another.

By centrifugation, when the impeller 130 rotates with the planet carrier 113, the oil received on the bottom 136 of the cup 135 is driven in rotation and pressurized between the bottom 136 and the side walls 139a, 139b of the cup 135. Each bowl 135a, 135b, by passing successively in front of the nozzle 133 during the rotation, collects a quantity of oil proportional to its circumferential extension. In fact, the radially inner edges of the walls 139a-139b-138 of a bowl 137a, 137b define an inlet surface of the bowl in the radial direction. This oil remains confined between the walls 138, 139a, 139b of the bowl 137a, 137b as long as the oil level with respect to the bottom 136 remains lower than the minimum height h of the walls 138 thereof with respect to the bottom 136. The radial inner edges 140a, 140b of the side walls 139a, 139b are approximately circular. Their radius R1 defines a general depth H of the cup 135 with respect to the bottom 136. Preferably, the circumferential dividing walls 138 have an inner radial edge 141 at a distance R2 from the axis A which is slightly greater than the radius R1 of the inner edges 140a, 140b of the side walls 139a, 139b. The height h of the circumferential dividing walls 138 with respect to the bottom 136 of the bowls 137a, 137b is therefore slightly less than the height H of the side walls 139a, 139b with respect to this same bottom 136.

In addition, the bottom 136 of each bowl 137a, 137b comprises an opening 142a, 142b which communicates with a pipe 143, 145 of an oil distribution circuit installed on the planet carrier 113.

With reference to FIGS. 4 and 5, the oil distribution circuits here are of two types. A first series of oil distribution circuits corresponds to the first pipes 143, which are evenly distributed around the circumference of the reduction gear 110 and in equal number to the number of planet gears 112. These pipes 143 start radially from the opening 142a of the bottom of the first series of bowls 137a and enter the inner enclosure of each planet gear axle 116, which is closed by the planet carrier 113. The oil flowing through the first pipes 143 enters the internal cavity of each planet gear axle 116 and then, due to the centrifugal force, passes through guide channels 144, which cross these planet gear axles 116 in a radial direction. These channels 144 open out at the periphery of the planet gear axle 116 at the bearings supporting the pinions of the planet gears 112 and thus ensure the lubrication of these bearings (FIG. 3).

The second series of oil distribution circuits comprises second pipes 145 which run from the openings 142b at the bottom of the bowls 137b of the second series of bowls between the planet gears 112 and are divided into several channels 145a, 145b. The channels 145a, 145b convey the oil to the gears formed by the pinions of the planet gears 112 and the planetary pinion 111 on the one hand, and the pinions of the planet gears 112 and the outer ring gear 114 on the other. Each channel 145a extends axially along the pinions of a planet gear 112, between them and the planetary gear 111, and forms a lubricating ramp across the entire width of the pinions. The channel 145b, which feeds the gear between the ring gear 114 and the pinions of the planet gear 112, projects its oil into the center of the cylinder formed by each planet gear 112. As shown, each planet gear 112 is made up of two parallel pinions. Their toothing is oriented diagonally with respect to the axis of rotation of the planet gear 112, so as to give them the function of grooves in which the oil is drawn from the center of the cylinder to its periphery to lubricate the gearing over its entire width.

In this example, the first oil distribution circuits 143-144, which lubricate the bearings supporting the planet gears, need to carry a greater flow rate of oil than the second circuits 145-145a-145b. For this reason, the circumferential extension of the bowls 137a of the first series, which correspond to them, is greater than that of the bowls 137b of the second series. Here, a ratio of two thirds to one third is sought in the oil flow rate in nominal operation; the circumferential extension of the two series of bowls 137a, 137b is substantially similar to this ratio.

The assembly was presented here with reference to a reduction gear architecture 110 with four planet gears 112 with two series of oil distribution circuits 143-144, 145-145a-145b of different types. For other reduction gear architectures, the number of bowls per series may be different. Similarly, the number of series of bowls with similar circumferential extensions may be different, depending on the type of oil distribution circuits. For example, the second oil distribution circuits could be subdivided into two, one dedicated to the gearing of the planet gear pinions 112 with the planetary gear 111 and the other dedicated to the gearing with the ring gear 114. In this case, an alternative embodiment of the oil recovery impeller is possible with three series of bowls with different circumferential extensions.

Figure 6:
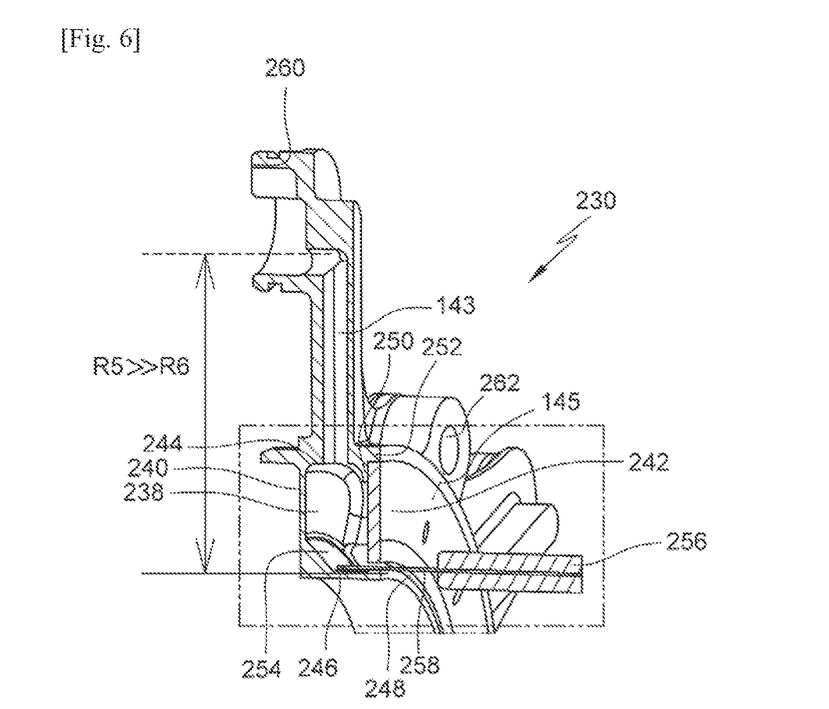
FIG. 6 is a partial schematic view in perspective and in axial section of an impeller according to an embodiment of the present disclosure.
Figure 7:
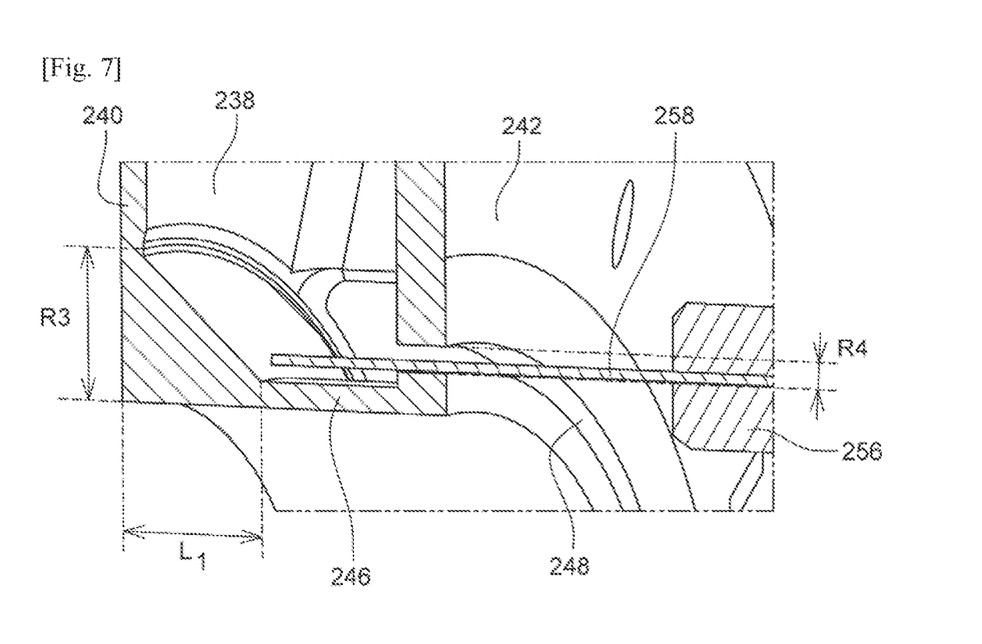
FIG. 7 is a larger scale view of a detail of FIG. 6.

FIGS. 6 and 7 illustrate the embodiment of an impeller 230 according to the present disclosure.

The impeller 230 comprises the characteristics described above and which are designated by the same references in FIGS. 3 to 5. They refer to in particular pipes 143 and pipes 145.

The impeller 230 has a general annular shape around the aforementioned axis A which is not visible in FIGS. 6 and 7. In the example shown, the impeller 230 can be made in one piece or by joining two or more pieces together.

The impeller 230 comprises means for supporting the axles 116 of rotation of the planet gears of the reduction gear, these supporting means being formed by cylindrical flanges 260 engaged in the internal cavities of these axles. The impeller 230 also comprises means for lubricating the toothing of the planet gears and the bearings of the axles 116, which comprise the aforementioned pipes 143, 145.

The lubricating means also comprise an annular cavity 238 located on the inner periphery of the impeller 230 and connected to the pipes 143, 145. The pipes 143 extend substantially radially between the cavity 238 and the axles 116 for the supply of oil. The channels 145 extend substantially radially between the cavity and orifices 262 for mounting nozzle (FIG. 6) or channels 145a, 145b such as those described above in relation to FIGS. 3 to 5.

The annular cavity 238 is bounded by two annular side walls 240, 242, an outer peripheral bottom wall 244, and an inner peripheral closing wall 246.

The walls 240, 242 extend radially between the walls 244, 246. The radially inner ends of the pipes 143, 145 open into the wall 244.

In contrast to the prior art where the supply of the impeller 130 is centrifugal, the cavity 238 of the impeller 230 is here closed radially on the inside by the wall 246 which extends axially between the walls 240, 242. The wall 246 is connected to the wall 240 and extends radially inside the wall 242 at a radial distance from it. The inner periphery of the wall 242 and the wall 246 thus define an annular aperture 248 between them for supplying lubricating oil to the cavity 238.

As mentioned above, the impeller 230 can be made in one piece. In the example shown, the wall 242 can be mounted and fixed to the rest of the impeller 230. For example, the outer periphery of the wall 242 is axially applied against a cylindrical shoulder 250 of the wall 244 and engaged in a cylindrical locating rim 252 of this wall 244.

The cavity 238 comprises an inner frustoconical surface 254 which is located opposite the aperture 248. This surface 254 is located at the junction between the walls 240, 246. Its end of largest diameter is located on the wall 240 and its end of smallest diameter is located on the wall 246.

The surface 254 can have an axial dimension L1 of between 30 and 60% of the axial dimension of the wall 246. The surface 254 may have a radial dimension R3 which is between 20 and 50% of the radial dimension of the wall 240. Alternatively, the aperture 248 has a radial dimension R4 of between 2 and 20% of the radial dimension of the wall 242 or the cavity 238, and/or between 5 and 20% of the radial dimension of the surface 254.

The double line in FIGS. 6 and 7 shows an oil jet 258 projected from a nozzle 256 fixed to a stator of the turbine engine.

The nozzle 256 is oriented parallel to the axis A (not visible) and projects the oil jet 258 into the cavity 238, through the aperture 248. This oil jet 258 impacts the surface 254.

In general, a reduction gear impeller distributes the oil to this reduction gear using the centrifugal forces generated by the planet carrier carrying this impeller. The oil pressure in the impeller depends on the height or radial dimension of the oil column available in the impeller as well as the speed of rotation of the impeller and the planet carrier. The height of the oil column is here increased by decreasing the internal diameter of the impeller, which is not limited by the presence of the nozzle 256. In the example shown, the oil column of the impeller has a radial height or dimension R5 which is significantly greater than the oil column height R6 of the prior technique (FIGS. 5 and 6). The dimension R5 is here measured between the wall 246 and the radially outer ends of the pipes 143.

The oil injected axially inside the cavity 238 is deflected radially outside by the surface 254, which acts as a deflector.

If the impeller is made in one piece, it could be made by additive manufacturing. In the above-mentioned case where the wall 242 is mounted and fixed, this wall 242 could be welded to the rest of the impeller.

The advantages of the axially lubricated impeller include the following:
  reduced radial size of the technology,
  an increase in the oil pressure in the impeller (approximately +10% increase at take-off, i.e. at the maximum speed of the impeller, in a particular embodiment of this impeller), and
  better oil trapping with low misalignment (possibility of reducing the flow rate and the quantity of oil required by the impeller); once the oil is in, the oil can be trapped thanks to the small radial dimension of the aperture 248 which is located on the inner periphery of the impeller.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. An assembly for an aircraft turbine engine, comprising:
an epicyclic speed reduction gear, and
at least one oil nozzle configured to project an oil jet parallel to a longitudinal axis of the turbine engine,
said reduction gear comprising a planet carrier equipped with an impeller configured to be fixed in rotation to said planet carrier and to be rotated about an axis of said reduction gear, said impeller having an annular shape about said axis and comprising means for lubricating in particular planet gear bearings of said reduction gear, said lubricating means comprising an annular cavity located at the inner periphery of said impeller, the impeller comprising an inner peripheral wall configured to close the cavity in the radial direction, the impeller comprising an annular aperture extending around said axis and opening in the axial direction into said cavity in order to be supplied with lubricating oil by said oil jet, said lubricating oil passing through the annular aperture,
wherein said cavity is axially bounded by first and second annular side walls, the first side wall being connected at a radially inner periphery to said inner peripheral wall, and the second side wall having a radially inner periphery radially spaced from said inner peripheral wall by a predetermined radial distance R4 to define said aperture, and in that said cavity comprises an inner frustoconical surface which is located axially opposite said aperture to be impacted by said oil jet and which has a radial dimension R3, with R4 less than R3.

2. The assembly according to claim 1, wherein said second side wall is mounted and fixed to the rest of the impeller.

3. The assembly according to claim 1, wherein R4 is between 5% and 20% of R3.

4. The assembly according to claim 1, wherein said surface has an axial dimension (L1) between 30% and 60% of an axial dimension of said inner peripheral wall.

5. The assembly according to claim 1, wherein the radial dimension R3 of said surface is between 20% and 50% of the radial dimension of at least one of said first and second side walls.

6. The assembly according to claim 1, wherein the radial dimension R4 of said aperture is between 2% and 20% of the radial dimension of at least one of said first and second side walls or of the radial dimension of the cavity.

7. The assembly according to claim 1, wherein said frustoconical surface is located at a junction between said first wall and said closing wall.

8. The assembly according to claim 1, wherein said lubricating means comprise oil pipes, mainly radial, and opening into said cavity.

9. The assembly according to claim 8, wherein at least some of the pipes comprise radial ends configured to be in fluid communication with internal cavities for lubricating bearings.

10. The assembly according to claim 8, wherein said pipes are evenly distributed about said axis.

11. The assembly according to claim 8, wherein at least some of said pipes are in fluid communication with the first longitudinal ends of lubricant nozzles, which are cantilevered at the outer periphery of the impeller.

12. The assembly according to claim 8, wherein the impeller comprises substantially radial arms comprising or carrying at their preferably radially outer ends means for supporting the axles of the planet gear, pipes being formed in these arms.

13. Aircraft turbine engine, comprising an assembly according to claim 1.

* * * * *